(12) United States Patent
Wilson

(10) Patent No.: US 11,961,124 B2
(45) Date of Patent: *Apr. 16, 2024

(54) SYSTEMS AND METHODS FOR PROVIDING NON-INTRUSIVE ADVERTISING CONTENT

(71) Applicant: Yahoo Ad Tech LLC, Dulles, VA (US)

(72) Inventor: Jeffrey Todd Wilson, Ashburn, VA (US)

(73) Assignee: Yahoo Ad Tech LLC, New York, NY (US)

( * ) Notice: Subject to any disclaimer, the term of this patent is extended or adjusted under 35 U.S.C. 154(b) by 1100 days.

This patent is subject to a terminal disclaimer.

(21) Appl. No.: 14/543,461

(22) Filed: Nov. 17, 2014

(65) Prior Publication Data

US 2016/0140621 A1 May 19, 2016

(51) Int. Cl.
*G06Q 30/0251* (2023.01)

(52) U.S. Cl.
CPC ............... *G06Q 30/0269* (2013.01)

(58) Field of Classification Search
CPC .......... G06Q 30/0261; G06Q 30/0257; G06Q 30/0269

See application file for complete search history.

(56) References Cited

U.S. PATENT DOCUMENTS

| 7,266,832 | B2 | 9/2007 | Miller |
| 8,051,442 | B2 | 11/2011 | Ergen et al. |
| 8,538,846 | B2 * | 9/2013 | Ransom ................. G06Q 30/02 705/35 |
| 8,671,423 | B1 | 3/2014 | Chang et al. |
| 8,732,240 | B1 * | 5/2014 | Tomkins ............... H04L 65/602 709/204 |
| 9,544,659 | B2 | 1/2017 | Wilson |
| 2002/0087402 | A1 | 7/2002 | Zustak et al. |
| 2002/0144262 | A1 | 10/2002 | Plotnick et al. |
| 2002/0194595 | A1 | 12/2002 | Miller et al. |
| 2003/0046690 | A1 | 3/2003 | Miller |
| 2004/0003402 | A1 * | 1/2004 | McKenna, Jr. ....... G06F 3/0481 725/46 |
| 2006/0150212 | A1 | 7/2006 | Magnussen et al. |
| 2007/0061838 | A1 | 3/2007 | Grubbs et al. |
| 2009/0235308 | A1 | 9/2009 | Ehlers et al. |
| 2010/0023960 | A1 | 1/2010 | Hasson |
| 2010/0166389 | A1 | 7/2010 | Knee et al. |
| 2011/0035769 | A1 | 2/2011 | Candelore et al. |

(Continued)

*Primary Examiner* — Alexandru Cirnu

(74) *Attorney, Agent, or Firm* — Bookoff McAndrews, PLLC

(57) ABSTRACT

Systems and methods are disclosed for providing non-intrusive advertising content to users. The method includes receiving user input reflecting user content preferences for receiving desired content related to specific topics in lieu of standard advertising content. The method may further include receiving a web request for electronic and then retrieving desired content based on user content preferences. Thereafter, the method may include choosing non-intrusive advertising content and generating one or more datagrams including the desired content and the non-intrusive advertising content. The requested electronic content along with generated datagrams content may then be provided for displaying.

19 Claims, 11 Drawing Sheets

(56) References Cited

U.S. PATENT DOCUMENTS

| | | |
|---|---|---|
| 2012/0066072 A1* | 3/2012 | Kanigsberg ......... G06F 16/9535 705/14.66 |
| 2012/0131626 A1 | 5/2012 | Gutiérrez |
| 2013/0326357 A1 | 12/2013 | O'Donnell et al. |
| 2014/0201785 A1 | 7/2014 | Dharmaji |
| 2014/0337880 A1 | 11/2014 | Sorbel et al. |
| 2015/0067714 A1 | 3/2015 | Bhogal et al. |
| 2015/0070516 A1 | 3/2015 | Shoemake et al. |
| 2015/0074732 A1 | 3/2015 | Green et al. |
| 2015/0154647 A1 | 6/2015 | Suwald et al. |
| 2015/0156566 A1 | 6/2015 | Sansom et al. |
| 2015/0195598 A1 | 7/2015 | Chang et al. |
| 2015/0195615 A1 | 7/2015 | Dharmaji |
| 2015/0208110 A1 | 7/2015 | Small et al. |
| 2015/0271417 A1 | 9/2015 | Benabdallah et al. |
| 2015/0296239 A1 | 10/2015 | Burger et al. |
| 2016/0066041 A1 | 3/2016 | Fei et al. |
| 2016/0080792 A1 | 3/2016 | Kosseifi et al. |

\* cited by examiner

SYSTEMS AND METHODS FOR PROVIDING NON-INTRUSIVE ADVERTISING CONTENT

TECHNICAL FIELD

The present disclosure relates generally to systems and methods for providing electronic content. More particularly, and without limitation, the present disclosure relates to systems and methods for providing non-intrusive advertising content to users, for example, by embedding non-intrusive advertising along with desired content based on receipt of a user preference.

BACKGROUND

Due to the vast and increasing amount of traffic generated by users on the Internet, businesses continue to seek more effective means to advertise their goods and services online. For content providers or web publishers, the ability to monetize advertising opportunities while providing online content is an important factor in being able to sustainably provide this content. An important factor for optimal monetization of advertising opportunities in online content is to ensure high user interaction or high conversion rates of the advertising content. One of the challenges with display advertising is that, over time and regardless of the content, users become conditioned to ignore ad placements. Accordingly, the likelihood that a user will view, listen to, or interact with an advertisement continues to be reduced even for advertisements that may be relevant to the user's interests and/or that they might otherwise find valuable.

One approach of presenting advertisements to retain target audience attention is to enlarge advertising space compared to page content so that it is better noticed. For example, one approach involves using rich media advertisements that momentarily expand to cover some or all of the content space of a web page. Other approaches include advertising content windows that "pop-up" over displayed content. Alternatively, advertising content may appear as part of a transparent or translucent screen that is displayed over content that is being viewed by a user, or advertising may be displayed as "native advertising," which tends to be disliked and perceived as deceptive. However, some of the above approaches may limit the amount of information that may be presented to a user, for example, in the case of mobile use. Moreover, while some of these approaches may provide more noticeable and effective advertising, some users may find these modes of advertising to be disruptive or distracting to their web browsing experience.

Online content providers strive to provide a positive user experience that enables them to maintain a sustained user base, and to therefore be able to generate sustainable and significant advertising revenue. Embodiments of the current disclosure involve providing advertising content in a non-intrusive manner that allows for positive user interaction with the advertising content, thereby preserving and growing a sustainable user base.

SUMMARY

Various embodiments of the present disclosure relate generally to improving methods for providing non-intrusive advertising. Each of the embodiments disclosed herein may include one or more of the features described in connection with any of the other disclosed embodiments.

According to some embodiments, computer-implemented methods are disclosed for providing advertising content. In one exemplary method, the method includes receiving user input reflecting user content preferences for receiving desired content related to specific topics in lieu of standard advertising content, receiving a web request for electronic content, a layout associated with a web page displaying the electronic content including specific regions for displaying advertising content, and retrieving the desired content to include in one of the specific regions based on user content preferences. The method may further include choosing non-intrusive advertising content to display along with the desired content, generating one or more datagrams including the desired content and the non-intrusive advertising content, and then providing the one or more datagrams for display in one of the specific regions for displaying advertising content.

According to some embodiments, systems are disclosed for providing advertising content. One system includes a memory having processor-readable instructions stored therein and a processor configured to access the memory and execute the processor-readable instructions, which when executed by the processor configure the processor to perform a method. In one exemplary method, the method includes receiving user input reflecting user content preferences for receiving desired content related to specific topics in lieu of standard advertising content, receiving a web request for electronic content, a layout associated with a web page displaying the electronic content including specific regions for displaying advertising content, and retrieving the desired content to include in one of the specific regions based on user content preferences. The method may further include choosing non-intrusive advertising content to display along with the desired content, generating one or more datagrams including the desired content and the non-intrusive advertising content, and then providing the one or more datagrams for display in one of the specific regions for displaying advertising content.

According to some embodiments, systems are disclosed for protecting user privacy in an online advertising environment. One system includes a memory having processor-readable instructions stored therein and a processor configured to access the memory and execute the processor-readable instructions, which when executed by the processor configure the processor to perform a method. In one exemplary method, the method includes receiving user input reflecting user content preferences for receiving desired content related to specific topics in lieu of standard advertising content, receiving a web request for electronic content, a layout associated with a web page displaying the electronic content including specific regions for displaying advertising content, and retrieving the desired content to include in one of the specific regions (formerly advertising placements) based on user content preferences. The method may further include choosing non-intrusive advertising content to display along with the desired content, generating one or more datagrams including the desired content and the non-intrusive advertising content, and then providing the one or more datagrams for display in one of the specific regions for displaying advertising content.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate exemplary embodiments of the present disclosure and, together with the description, serve to explain the principles of the disclosure.

DETAILED DESCRIPTION

Figure 1:
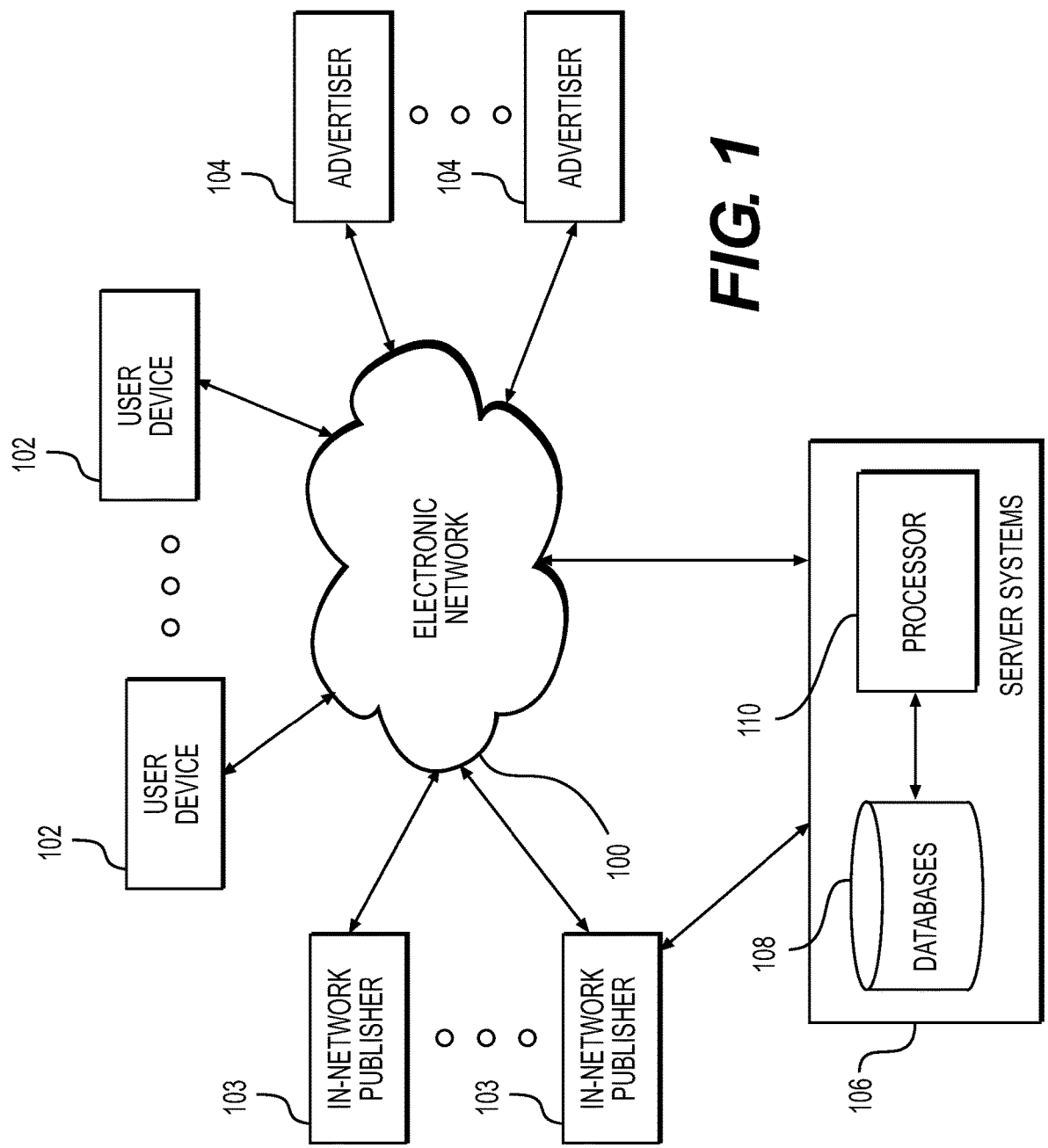
FIG. 1 shows a block diagram of an exemplary online advertising environment for providing non-intrusive advertising, consistent with exemplary embodiments.

The present disclosure describes systems and methods for providing users with non-intrusive advertising content. In one exemplary embodiment, a user or viewer of online content may be solicited to indicate whether they would prefer to receive specific content or information related to a topic of interest to them, to be displayed instead of conventional advertisements in traditional advertising spaces. For example, a user may indicate interest in particular content or information related to, e.g., stocks, sports scores, weather, a topical newsfeed, etc. Accordingly, either by an explicit selection of a topic related to particular content or tagging (e.g., liking) of a particular topic on social media, a user may request that their web browsing experience going forward will include desired content of their choice, in place of advertising. Thereafter, when a user visits a web page of a publisher in an advertising network (e.g., when an instance of the publisher web page executing in the user's browser generates a request to fill any available ad space on the page), content selected based on the user's preferences may be provided instead of advertising. The exemplary method may then include retrieving updated data related to a user's desired content. For example, if a user's desired content is sports scores, then updated sport scores may be retrieved and displayed instead of advertising in an advertising space.

The exemplary method may further include choosing non-intrusive advertising content to display with the user-requested content, as selected from a set of non-intrusive advertising content associated with various potential advertising entities. Non-intrusive advertising content may refer to non-intrusive indicia of advertising entities, such as logos, branding terms, images, thumbnails, etc., that may be included, embedded, and/or watermarked along with a user's desired content. The combination of a user's desired content along with the non-intrusive advertising content may be used to generate a so-called "datagram" that may be displayed in any pre-designated advertising spaces within a web page. As used herein, a datagram well be used to refer to any combination of user-requested content and non-intrusive advertising that are served together in a display advertising space. For example, if a user's previous input indicates a desire to receive sports scores, a datagram presented within a pre-designated advertising space of a web page, which is being accessed at a later time, may contain scores of all live football games along with a watermark stating "brought to you by Company X."

In some embodiments, non-intrusive advertising content may be chosen based on a user profile associated with the user. An exemplary user profile may be generated based on user behavior, user demographics, user interests, among other factors. In one exemplary scenario, two users may both request sports scores. However, a first datagram containing sports scores presented to a forty year old user may contain a logo of a first company targeting a person of his age demographic, while a second datagram presented to a second user who is a teenager, may contain a logo of a second company targeting the teenager demographic. Accordingly, exemplary methods provide an efficient, non-intrusive way of providing advertising content that is embedded within desired content that is specific for each user. Since the desired content is selected based on a user's own explicit preferences, the user is likely to pay attention to and interact with any displayed datagrams throughout their browsing experiences. Such an approach allows an advertising entity to target its audience in a manner that is likely to create minimal negative reaction from a user (as well as increase the likelihood that the user will notice the placement and interact with it). Therefore, exemplary embodiments provide for an advertising approach that may be particularly helpful in aiding an advertising entity in enhancing its general brand recognition or creating positive associations with a particular brand.

While principles of the current disclosure are described with reference to online content, it should be understood that the disclosure is not limited thereto. Rather, the systems and methods of the present disclosure may be used in any networked system with user interfaces to provide non-intrusive advertising content. Reference will now be made in detail to the exemplary embodiments of the disclosure, examples of which are illustrated in the accompanying drawings. Wherever possible, the same reference numbers will be used throughout the drawings to refer to the same or like parts.

FIG. 1 is a schematic diagram of an exemplary network environment in which various user interfaces may display online content, according to an embodiment of the present disclosure. As shown in FIG. 1, the environment may include a plurality of user or client devices 102 that are communicatively coupled to each other as well as a plurality of server systems 106 via an electronic network 100. Electronic network 100 may include one or a combination of wired and/or wireless electronic networks. Network 100 may also include a local area network, a medium area network, and/or a wide area network, such as the Internet.

In one embodiment, each of user or client devices 102 may be any type of computing device configured to send and receive different types of content and data to and from various computing devices via network 100. Examples of such a computing device include, but are not limited to, a desktop computer or workstation, a laptop computer, a mobile handset, a personal digital assistant (PDA), a cellular telephone, a network appliance, a camera, a smart phone, an enhanced general packet radio service (EGPRS) mobile phone, a media player, a navigation device, a game console, a set-top box, or any combination of these or other types of computing devices having at least one processor, a local memory, a display (e.g., a monitor or touchscreen display), one or more user input devices, and a network communication interface. The user input device(s) may include any type or combination of input/output devices, such as a keyboard, touchpad, mouse, touchscreen, camera, and/or microphone.

In one embodiment, each of the user or client devices 102 may be configured to execute a web browser or mobile browser installed for displaying various types of content and data received from any of server systems 106 via network 100. Server systems 106 in turn may be configured to receive data related to user interaction with the web browsers or mobile browsers displayed in the user or client devices 102. The user interaction may occur at each device 102 through an interface provided on a web page loaded within the browser executable at each device. It should be noted that server systems 106 may be implemented using a single server device or system or may refer to a combination of multiple servers. Additionally, server systems 106 may contain one or more additional servers, such as an advertising server (not illustrated), user profile server (not illustrated), and user request server (not illustrated). An exemplary user request server may be configured to solicit user preferences regarding desired content related to a topic of interest. An exemplary advertising server may also be configured to receive a request from an instance of a publisher web page, executing in a user's browser, to fill any available ad space on a web page of the publisher. In some embodiments, the advertising server may provide datagrams to fill the available ad space on a particular web page. The datagrams may be able to "follow" the user from one platform to another using cross-device and/or cross-platform correlation technologies. Further details with respect to generation of datagrams are provided in the explanation accompanying FIGS. 2-5.

The advertising server may also determine whether a particular user is the target audience for a particular advertisement entity, i.e., an advertiser. A user profile server may be configured to generate and/or update a user profile associated with a user, which may be used to determine the user requested content and/or the non-intrusive advertising content to include in a datagram. An exemplary user profile server may receive a request with a unique identifier, and subsequently check to see if there is any existing information in the system for that identifier. If no data related to a particular identifier is included, then new data may be created for the unique identity. The data reflects a user's online activities and/or preferences. If previous data related to a unique identity previously exists, then the previous data may be updated. The user profile may be used to match a user with a target audience of an advertising entity. Therefore, relevant non-intrusive advertising content associated with a particular advertising entity may be embedded within a datagram that is generated for displaying to a particular user in a web page.

As shown in FIG. 1, server systems 106 may include processor 110. In one embodiment, processor 110 may be configured to provide datagrams including user-requested content and non-intrusive advertising content within web pages as will be described in further detail below with respect to FIGS. 2-5. In one embodiment, processor 110 may be configured to receive instructions and content from various sources including user or client devices 102 and store the received content within databases 108. In one embodiment, databases 108 may be any type of data store or recording medium that may be used to store any type of data. For example, databases 108 may store information related to user preferences for receiving desired content related to specific topics. Additionally, databases 108 may store demographic and metrics of target audiences for advertising, user profile data, advertising content, user-generated content, etc. In some implementations, data may be stored in the databases 108 in an encrypted form to increase security of the data against unauthorized access. Processor 110 or any additional processors within server systems 106 may also be configured to provide content to client or user devices 102 for displaying. The displayed content may include, for example, web content that has been processed or received with embedded advertising content. For example, processor 110 may transmit web page content including datagrams in place of traditional display advertising. In some embodiments, client devices 102 may be used by certain users to input or manage web content that is managed by processor 110. For example, specifications regarding what kind of non-intrusive advertising content may be provided may be accessed or controlled by an advertising entity using one of the user or client devices 102.

Figure 3A:
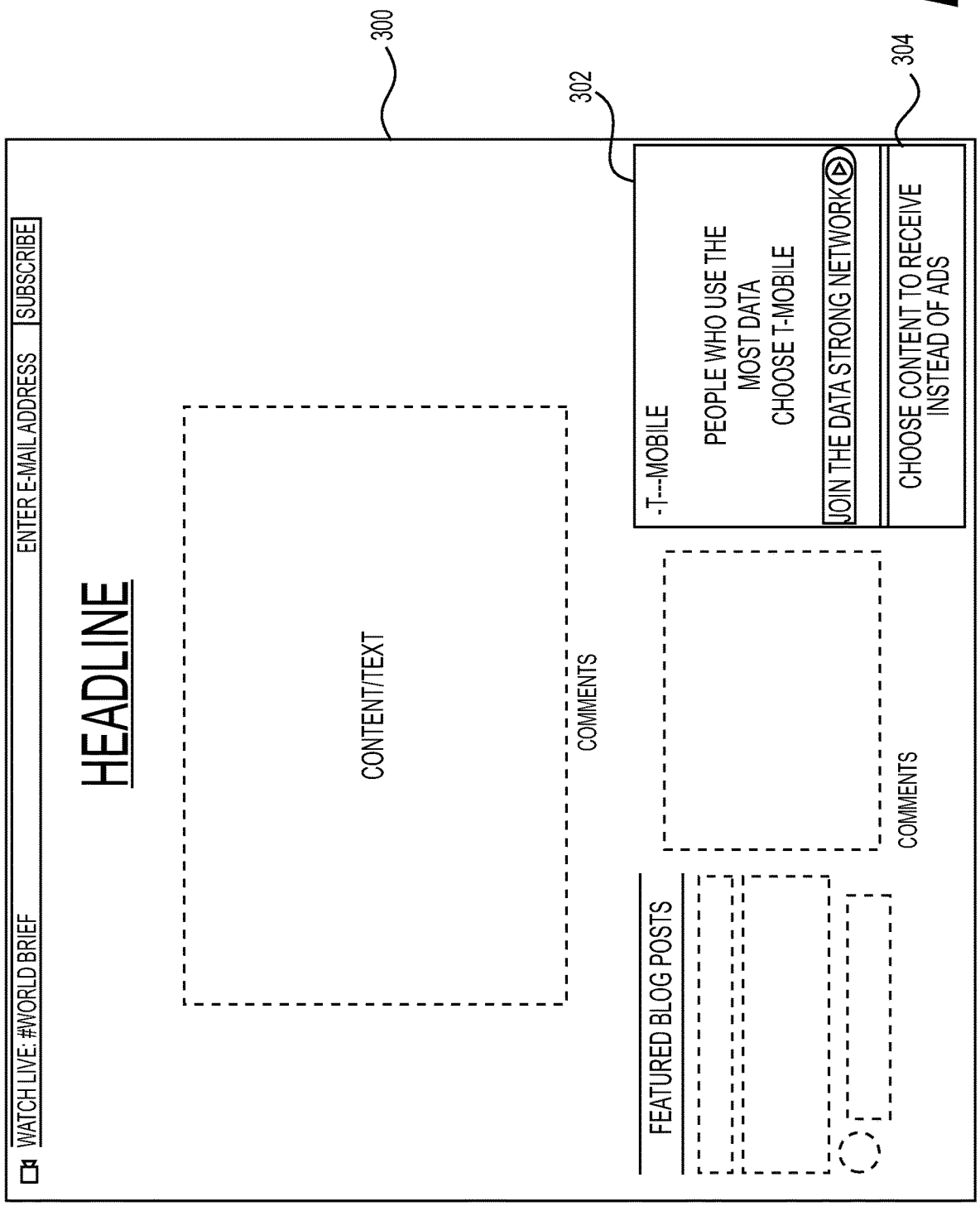
FIG. 3A is an exemplary screenshot of a web page or other graphical user interface for prompting a user to request content in lieu of ads, consistent with exemplary embodiments of the present disclosure.

A user may input their content preferences in any desired manner. In a first exemplary manner, a user's preferences regarding desired content in lieu of standard advertising content may be explicitly solicited while they are browsing online content. For example, FIG. 3A displays an example user interface 300, such as a website, that displays online content, consistent with exemplary embodiments of the present disclosure. The online content may include any textual, graphical, video, and/or photographic content provided by a publisher of the web page. Moreover, as is consistent with many publisher sites, the web page may also include advertising space 302 by which the publisher may monetize the views or "impressions" of the publisher's online content. As shown in FIG. 3A, advertising space 302 may include a traditional advertisement (in this case for a mobile device). However, consistent with embodiments of the present disclosure, advertising space 302 may also be provided along with a banner 304, which indicates that a user may initiate a sequence to request to be shown a particular type of desired content to receive in advertising spaces in lieu of traditional ad content. Specifically, as shown in FIG. 3A, the banner 304 may display the prompt: "Choose content to receive instead of ads."

Figure 3B:
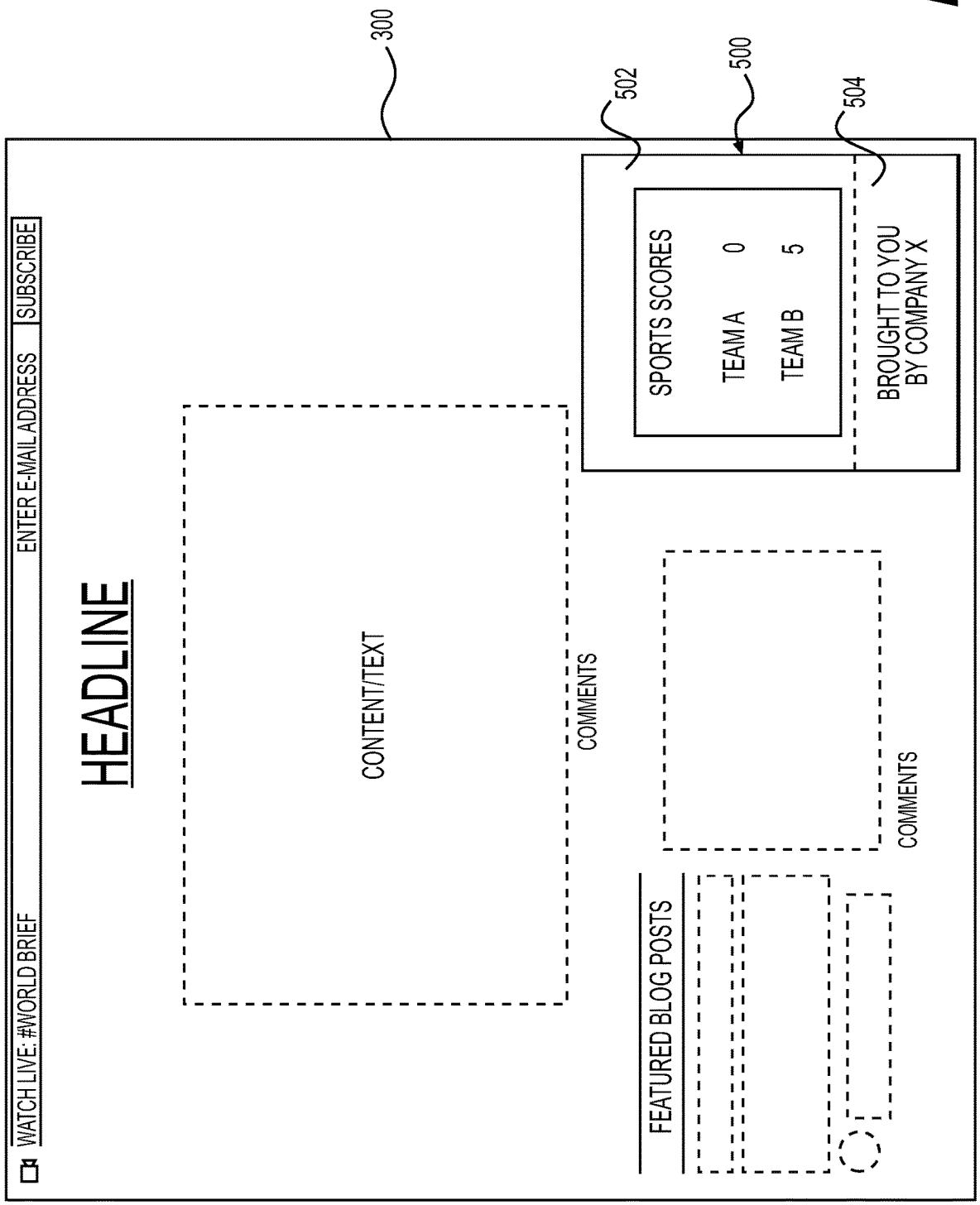
FIG. 3B is an exemplary screenshot of a web page or other graphical user interface for displaying requested content to a user in lieu of ads, consistent with exemplary embodiments of the present disclosure.

Once a user has elected to click-through banner 304 and established a process for requesting and receiving desired content in lieu of advertising, the user may indeed receive desired content in place of advertising when browsing sites affiliated with a provider of banner 304. For example, FIG. 3B illustrates a scenario in which desired content is displayed in place of advertising. Specifically, FIG. 3B depicts the same web page 300, except now having desired content 502 (and optionally also non-intrusive advertising 504) displayed within a traditional advertising space 500. In this example, the desired content 502 includes sports scores and the non-intrusive advertising 504 reflects that the desired content 502 is sponsored by "Company X." In this exemplary scenario, non-intrusive advertising 504 may provide the name and/or logo of an advertising entity, e.g., as a watermark. The embodiment of FIG. 3B may advantageously provide desired content in lieu of advertising within a space that is traditionally used only for advertising. However, the embodiment of FIG. 3B may also enable monetization by informing the user that their desired content was made possible by the sponsoring company (i.e., advertiser). The embodiment of FIG. 3B may advantageously engender user satisfaction with both the sponsoring company (i.e., advertiser, "Company X"), and with the publisher and/or ad network, since the user may be pleased to view desired content of interest within advertising space 500, as opposed to a full, traditional display ad.

In some embodiments, other methods of embedding the non-intrusive advertising content with the desired content may be used. In one exemplary approach, instead of watermarking, a datagram may display the desired content interspersed with periodic display of non-intrusive advertising content. For example, a datagram may display sports scores and highlights, with a periodic display of a logo associated with an advertising entity.

Figure 2:
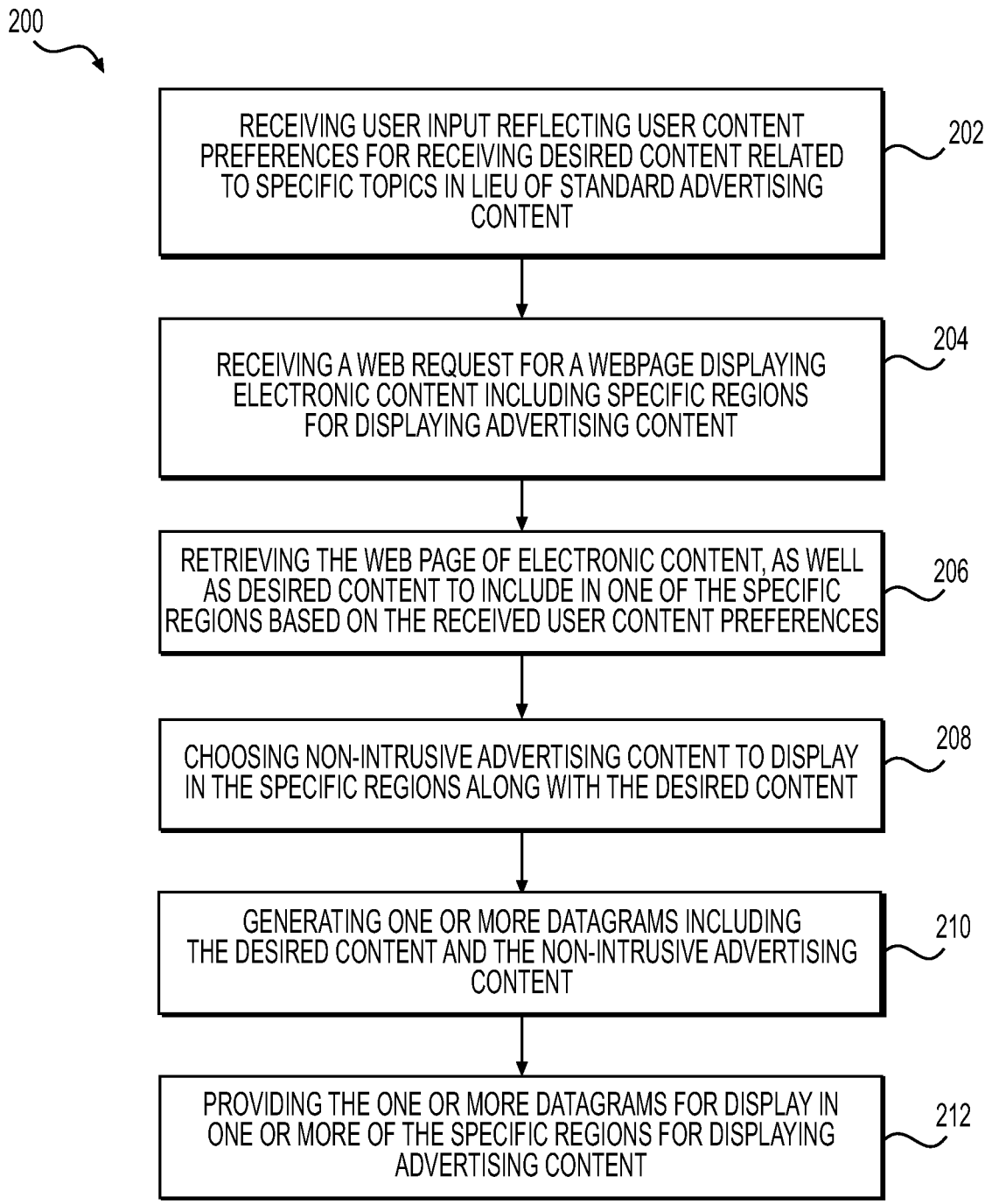
FIG. 2 is a flow diagram of an exemplary method for providing non-intrusive advertising in an online advertising environment, according to an embodiment of the present disclosure.

FIG. 2 is a flow diagram of a method 200 for providing advertising content, according to an exemplary embodiment of the present disclosure. In further detail, as shown in FIG. 2, step 202 of method 200 may include receiving user input reflecting user content preferences for receiving desired content or information related to specific topics in lieu of standard advertising content. User input reflecting user content preferences may be specific user-provided opt-in preferences regarding content that they wish to view/interact with, instead of receiving advertising content that is typically presented in advertising spaces. Accordingly, specific information relating to a user's preferences may be provided in advertising spaces in lieu of traditional display ads or sponsored content. The desired content or information related to specific topics may include sports scores, stock market activity, traffic info, weather, news topics etc.

Figure 4A:
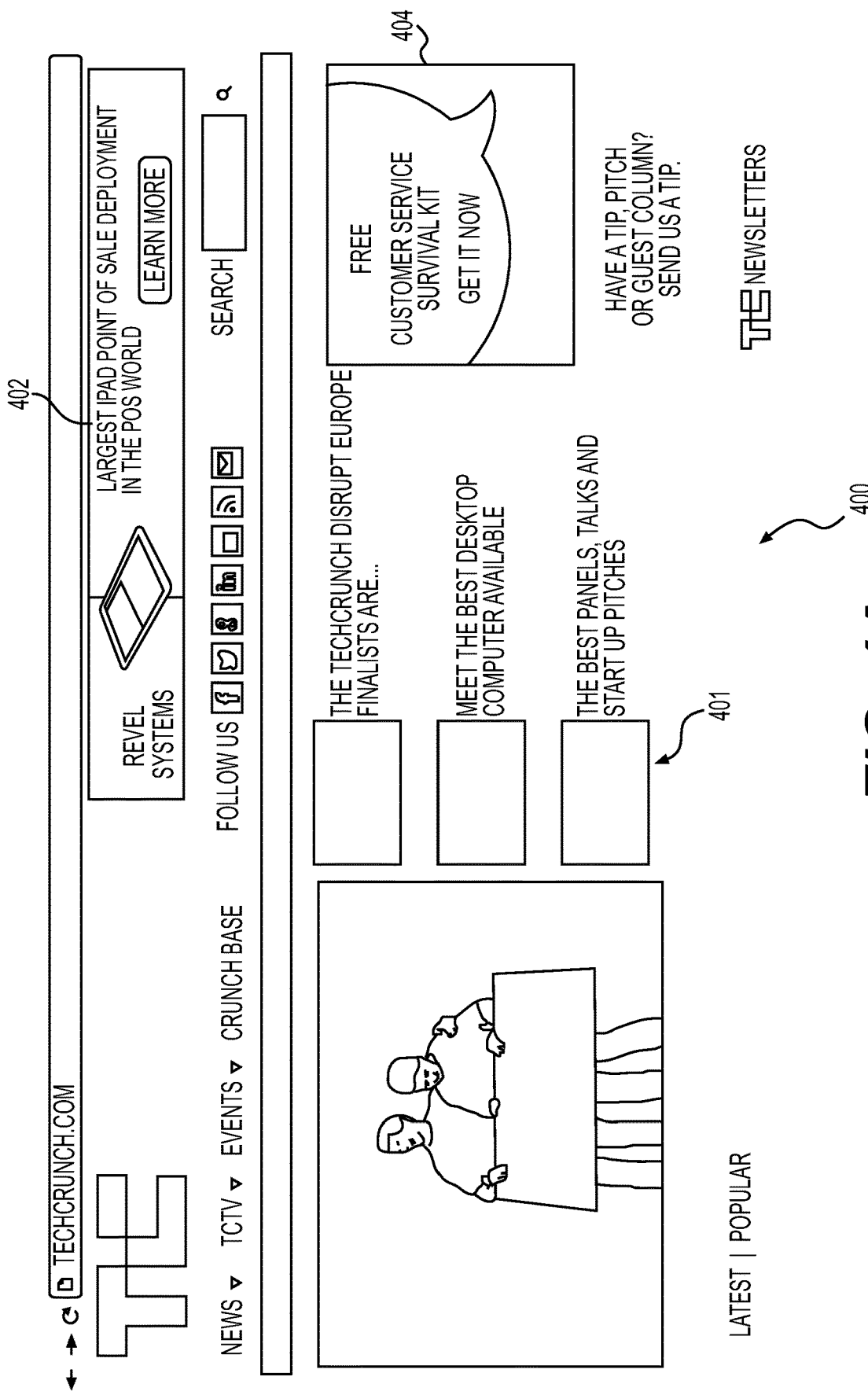
FIG. 4A is an exemplary screenshot of a web page or other graphical user interface for displaying traditional online ads to a user, consistent with exemplary embodiments of the present disclosure.
Figure 4B:
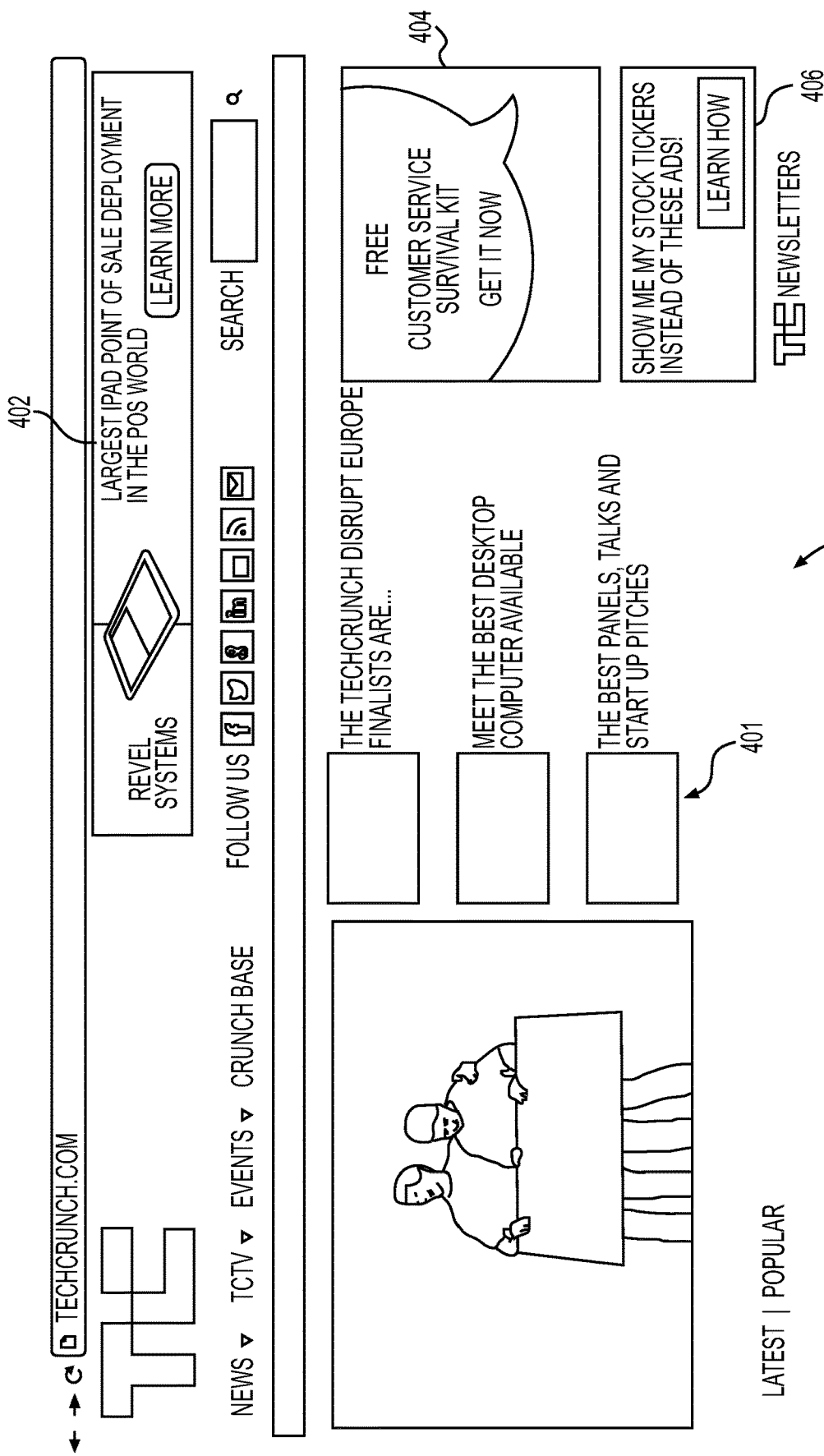
FIG. 4B is an exemplary screenshot of a web page or other graphical user interface for prompting a user to request content in lieu of ads, consistent with exemplary embodiments of the present disclosure.

Method 200 will be described with reference to the screenshots of FIGS. 4A-4E. For example, FIG. 4A depicts an exemplary screenshot of a web page 400 having a banner ad 402 and a display ad 404 in relation to content 401. Banner ad 402 and/or display ad 404 may have been selected and displayed, for example, in relation to a particular user or web page content 401 using any desired methods. In one embodiment consistent with the present disclosure, web page 400 may be modified as shown in FIG. 4B. For example, like web page 400 of FIG. 4A, the web page 400 of FIG. 4B may have a banner ad 402 and a display ad 404 shown in association with web page content 401. However, web page 400 of FIG. 4B (like web page 300 of FIG. 3A) may also have a prompt 406 prompting a user to request to receive desired content in lieu of traditional banner and/or display advertising. Specifically, as shown in FIG. 4B, the prompt 406 may display text such as, "Show me my stock tickers instead of these ads." Of course, prompt 406 may alternatively display a more general prompt, such as that of FIG. 3A, or an alternative prompt, such as, "Show me my sports scores instead of these ads" or "Show me my news instead of these ads," for example. In some cases, the prompt may be integrated into a social networking widget, similar to a "like" or "share" widget; for example, the prompt may be implemented into a social networking "Follow me" widget, as will be described in relation to FIG. 4E.

In some embodiments, after clicking or otherwise selecting banner 406, a user may be prompted to input specific information related to their interests. For example, lists of various topics arranged by various categories may be displayed upon the selection of banner 406. A user may thereby select a particular topic to indicate their preferences. Exemplary categories may be arranged in various methods. For example, in a sports category, news and scores for individual teams may be presented. In such a scenario, a user does not need to input any personal information. Alternatively, a user may be able to type in their interests, in response to which, suggested topics may be provided to a user. In another exemplary approach, users may be enabled to "tag" (e.g., Facebook Like) content that they find of interest. Such content may be frequently-changing content, content related to events, and/or content of various publisher sites, etc. Accordingly, a user's preferences regarding what desired content to provide going forth in datagrams instead of standard advertising content may be stored based on the user's liking or tagging of content related to a specific topic.

In exemplary embodiments, a notification may be provided to a user after they select, tag, or like, content related to a specific topic, to notify the user that datagrams containing their desired content, as reflected by their actions, may be provided to them in advertising spaces in lieu of typical advertising in their future browsing experiences. For example, if a person "likes" or "follows" a particular sport or other topics on a social media platform, they may receive a notification that, based on their selection, they will receive datagrams containing information related to that sport in lieu of standard advertising content. In some embodiments, a user may be provided an option to modify the automatic selection of desired content in datagrams so that they may accurately specify the information that they are interested in. Alternatively, a user may be able to opt-out of receiving datagrams that may be embedded within online content. In one embodiment, a user's input regarding their desired content may be a search query that is input. Therefore, the user-requested content in the datagram may be dynamically updated search results window that follows the user around in publisher websites that are included within the advertising network.

Figure 4C:
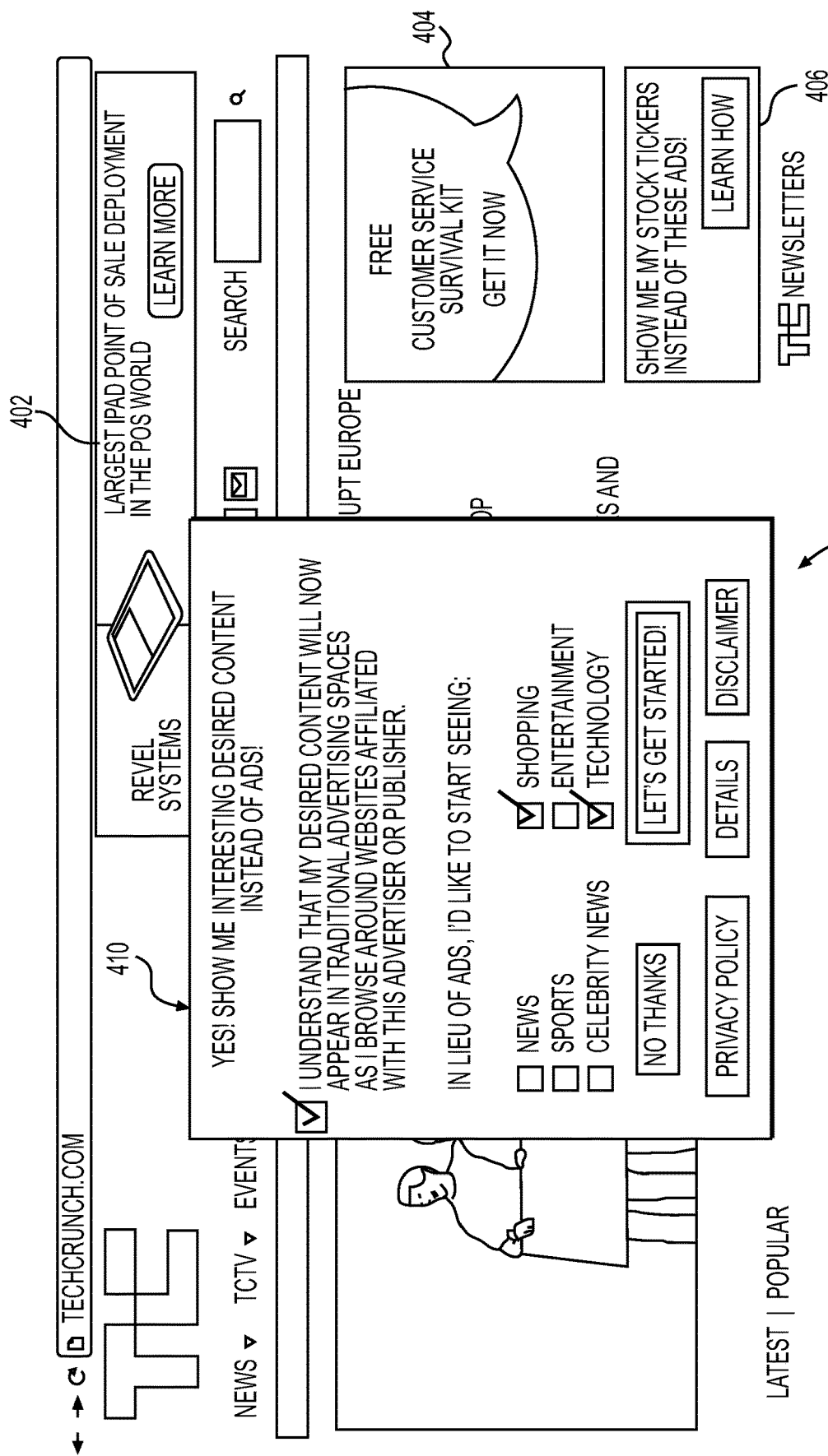
FIG. 4C is an exemplary screenshot of a web page or other graphical user interface for confirming a user request to receive content in lieu of ads, consistent with exemplary embodiments of the present disclosure.

FIG. 4C depicts an instance of web page 400 including a pop-up window or other graphical display of a prompt 410 for confirming a user's desire to be shown desired content in place of advertising within traditional advertising spaces, consistent with the above descriptions. For example, as shown in FIG. 4C, the prompt 410 may say something similar to the displayed text, such as, "I understand that my desired content will now appear in traditional advertising spaces as I browse around websites affiliated with this advertiser or publisher." As shown in FIG. 4C, the prompt 410 may also include a user interface by which a user may selectively input user preferences, such as topics of interest to the user for use in selecting desired content to show the user within the traditional advertising spaces. For example, as shown in FIG. 4C, the prompt 410 may include "radio buttons" or other UI elements enabling the user to select subject-matter topics, like "News," "Sports," "Celebrity News," "Shopping," "Entertainment," "Technology," and so on. In some cases, prompt 410 may include user elements enabling the user to link other content-related sites, such as a news reader, RSS feed, social networking site, and so on. Thus, a user may selectively opt-in to receive content that would have otherwise appeared in the user's news reader, RSS feed, or social networking feed in locations that are traditionally associated with pure display advertising.

Figure 4D:
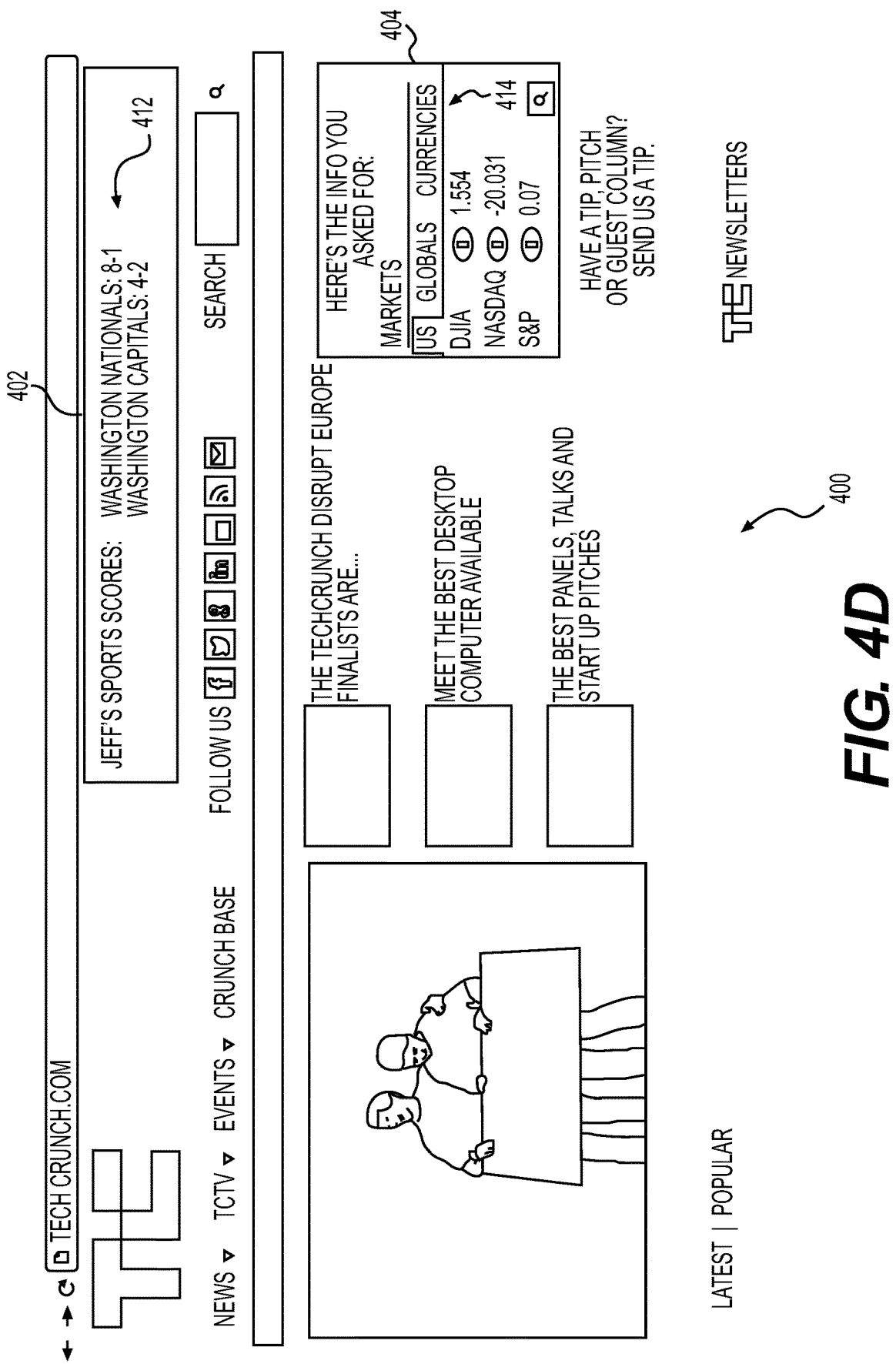
FIG. 4D is an exemplary screenshot of a web page or other graphical user interface for displaying requested content to a user in lieu of ads, consistent with exemplary embodiments of the present disclosure.

FIG. 4D depicts another instance of web page 400 in which a user has already clicked-through user element or link 406 (FIG. 4B), and selectively opted-in to a desired content display method (optionally using the user preferences prompt of FIG. 4C). Accordingly, FIG. 4D depicts an instance of web page 400 in which the banner and display ads 402, 404 of FIGS. 4A-4B are replaced by desired content relevant to the user's explicit content display requests and/or preferences. For example, as shown in FIG. 4D, banner 402 now displays the user's requested sports scores 412, consistent with the user's preferences received in prompt 410. In addition or alternatively, display ad 404 now includes the user's requested stock information 414, consistent with the user's preferences received in prompt 410. Of course, the user-requested information displayed in FIG. 4D is only exemplary in nature. The information or content displayed in banner and display ads 402, 404 may be switched, may match, may be different, may be interactive, may be explicitly selected by the user in prompt 410, may be inferred as being of interested based on prompt 410, and so on. Certain exemplary steps for generating web page 400 including desired content 412, 414 will now be described with further reference to method 200 of FIG. 2.

Figure 4E:
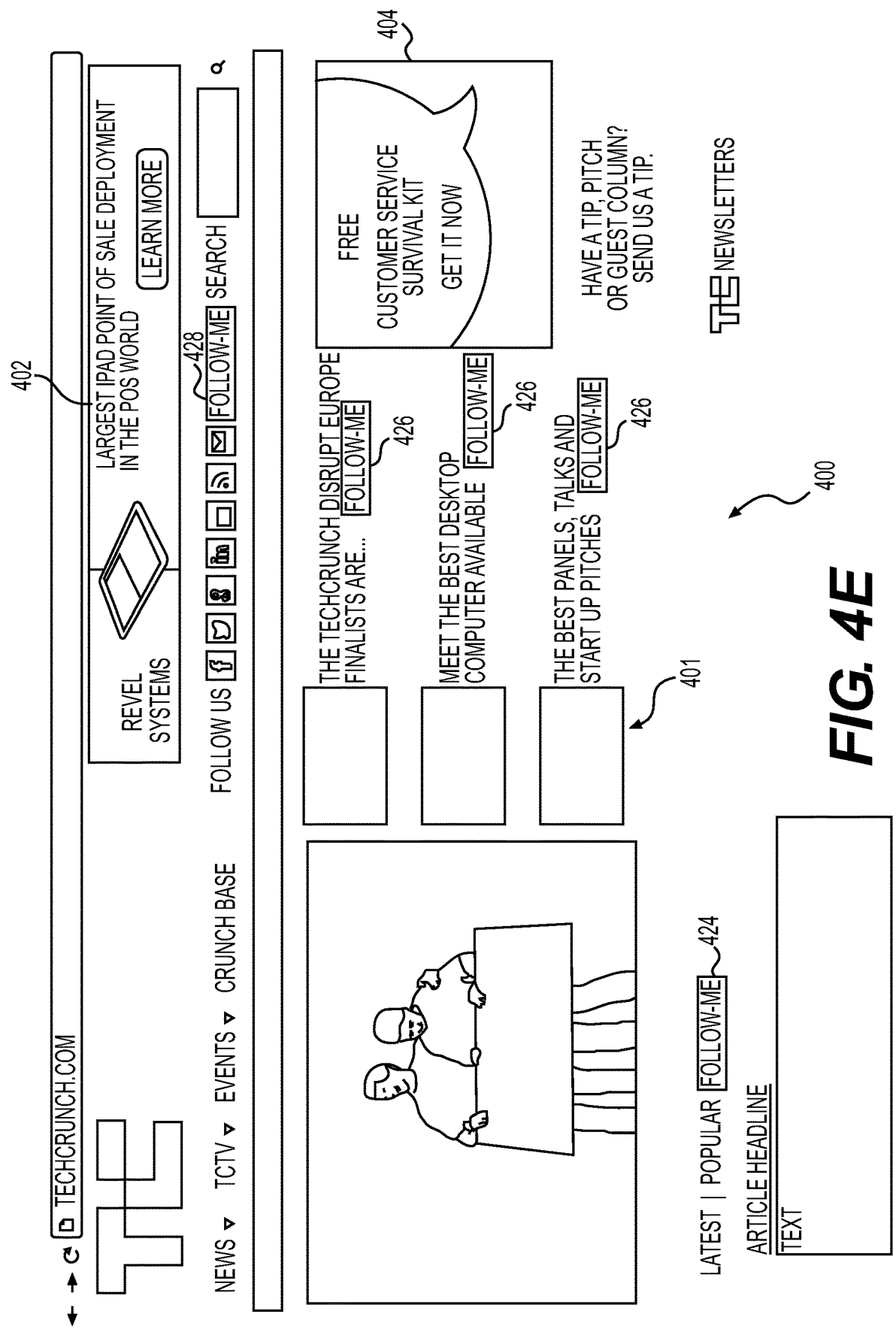
FIG. 4E is an exemplary screenshot of another web page or other graphical user interface for prompting a user to request content in lieu of ads, consistent with exemplary embodiments of the present disclosure.

FIG. 4E depicts another instance of web page 4E, this time displaying hyperlinks and/or widgets by which a user may request to have related content shown to them in lieu of advertising content. Specifically, FIG. 4E depicts hyperlinks and/or widgets 424, 426, 428, which a user can selectively interact with to request that desired content be shown to the user in lieu of advertising content. As with the prompts displayed with respect to FIGS. 4A-4D, a user may select one of the so-called "Follow-me" widgets to request to be shown content that relates in some manner (e.g., by topic, author, date, keyword, etc.) to the content displayed along with the Follow-me widget. Although widgets 424, 426, 428 display the text "Follow-me," they may display any other text (e.g., "Show me this," or "Display this, not ads," or "Show me more!" or "Replace ads with stuff like this," or any similar sentiment) or even icons that come to be associated with such a sentiment. As shown in FIG. 4E, widgets 424, 426, 428 are shown next to, or in any relation to, any type of content, such as articles, headlines, links, content items, videos, social networking items, and so on. In one embodiment, the widgets may be implemented like a proprietary social networking widget that appears both in a social networking environment as well as across the Internet, such as across a content network. For example, widget 428 may appear next to other widgets, such as RSS feeds, email links, and so on.

Referring again to FIG. 2, step 204 of method 200 may include receiving a web request for a web page displaying electronic content including specific regions for displaying advertising content. That is, a user may attempt to access a web page that contains content. For example, a user may visit a web page of a publisher, where the web page may have areas designated as advertisement areas. As described above, FIG. 4D illustrates an exemplary screenshot of a web page 400 displaying the electronic content, consistent with exemplary embodiments. In one exemplary scenario, the layout may be associated with a news blog, or other content website. Therefore, in some embodiments, when a user visits the web page of a publisher, an instance of the publisher web page executing in a user's browser generates a request for content to fill any available ad space on the page. In this exemplary scenario, advertising section 404 may be filled with a datagram generated based on additional steps of method 200 discussed below. As described above with respect to FIG. 3B, the advertising section 404 may be replaced not only with desired content 414, but also optionally a non-intrusive advertisement, such as the non-intrusive advertising 504 shown in FIG. 3B.

Step 206 of method 200 may include retrieving the desired content to include in one of the specific regions based on user content preferences. The specific region may refer to a region (or advertising space) where a datagram may be displayed in lieu of typical advertising content. For example, desired content related to specific topics for which a user has chosen to receive information may be retrieved from databases 108. As an example, for sports scores, retrieving desired content may entail retrieving latest score updates for a sport of interest. As an additional example, for stocks, updated ticker information may be retrieved from various sources. Any information included within a datagram may be periodically or constantly updated as it is being displayed. Therefore, a datagram to be displayed in the advertising section 404 may provide desired content directly based on user content preferences.

Step 208 of method 200 may include choosing non-intrusive advertising content to display along with the desired content. As discussed above with respect to FIG. 1, the non-intrusive advertising content may include one or more logos, specific marketing phrases, images, thumbnails, etc. The non-intrusive advertising content may be chosen from a set of non-intrusive advertising content based on comparing a profile of the user with one or more demographics targeted by an advertiser. For example, a user profile of a user may first be generated based on data related to a user. For example, a user profile may be generated within server systems 106 based on data that is associated with the user. Data related to a user may include, but is not limited to, device identity associated with a user, demographic data, user behavior, user preferences, specific personal data of the user associated with a client device, etc. Therefore, an exemplary user profile may be based on user behavior along with any additional data that may be available regarding the user (for example, demographic information) associated with user device 102. For the comparison, an advertising entity may provide data related to a targeted audience for advertising content. Then, the user profile of a user associated with a particular client device may be used to determine what non-intrusive advertising content should be provided to the user. For example, demographics of targeted potential customers may be compared with a user profile associated with a user and, based on the similarity, non-intrusive advertising content may be chosen.

In another embodiment, the non-intrusive advertising content may be chosen not just based on a user profile, but rather or also, based on an association of the non-intrusive advertising content with user content preferences. That is, each type of desired content may have advertising entities (and related non-intrusive advertising content) associated with it. For example, if a user preference for desired content is stock information, then the non-intrusive advertising content may be related to financial institutions.

In other embodiments, the non-intrusive advertising content may be based on a combination of user content preferences and a user profile associated with a user. For example, a desired content preference for two users may be stock information. In this exemplary scenario, potential non-intrusive advertising content may relate to various advertising entities that are financial institutions. A first institution's target audience may include a first demographic, such as a high-level income group, while a second institution's target audience may include new college graduates. The first user may belong within the high-level income group and the second user may be a teenager. Accordingly, while the same stock information may be included in respective datagrams that are generated and displayed as desired content for both of the first and the second individuals, the non-intrusive advertising content for a datagram for the first user will be associated with the first financial institution, while the non-intrusive advertising content for a datagram for the second user will be associated with the second financial institution.

Step 210 of method 200 may include generating one or more datagrams including the desired content and the non-intrusive advertising content. That is datagrams may be generated by embedding, watermarking, and/or overlaying the non-intrusive advertising content in/on desired content. Generated datagrams may be served to a user throughout an advertising or publishing network in lieu of display ads. That is, the desired content or information related to a topic selected by customer's preferences may be constantly updated and displayed in designated advertising spaces to a user along with non-intrusive advertising content, throughout an advertising network. Specifically, a user may be recognized based on the user's ID by using cookie data that may be accessed throughout an advertising or publishing network Step 212 of method 200 may include providing the one or more datagrams for display in one of the specific regions for displaying advertising content. That is, data for both web content and datagrams may be provided to user device 102 for displaying. In embodiments, the electronic content for displaying in non-advertising designated regions within a web page may be retrieved from various sources within or connected to server systems 106.

To continue an example from FIG. 3A discussed above, FIG. 5C displays an exemplary graphical user interface, consistent with embodiments of the present disclosure. User interface 300 now contains datagram 500 instead of advertising space 302 and/or banner 304. In embodiments, clicking on any content within a displayed datagram may return a user to a publisher site for more detailed information. That is, a user may be directed toward more detailed information regarding the selected content. For example, if desired content box 502 is clicked upon, then further details regarding the desired content may be provided. Alternatively, if a user clicks on non-intrusive advertising content of region 504, a user may be provided additional information with regards to the associated advertising entity, a specific promotion, or more detailed advertising, etc. For example, if region 504 is selected, a user may be directed to a page providing more information regarding a product or advertising entity associated with the non-intrusive advertising content presented in region 504.

Accordingly, exemplary method 200 aids in providing an efficient, non-intrusive way of providing non-intrusive advertising content that is embedded within desired content. Exemplary methods of non-intrusive advertising may lead to a dual benefit of allowing online content providers to provide positive user experiences to users, and of creating positive associations of certain brands for the users. This approach may aid content providers in maintaining a sustained user base and, therefore, to be able to generate advertising revenue. At the same time, advertising entities may be able to promote their brand in a more sophisticated manner with better overall impact.

The examples described above with respect to FIGS. 1-5, or any part(s) or function(s) thereof, may be implemented using hardware, software modules, firmware, tangible computer readable media having instructions stored thereon, or a combination thereof and may be implemented in one or more computer systems or other processing systems.

Figure 5:
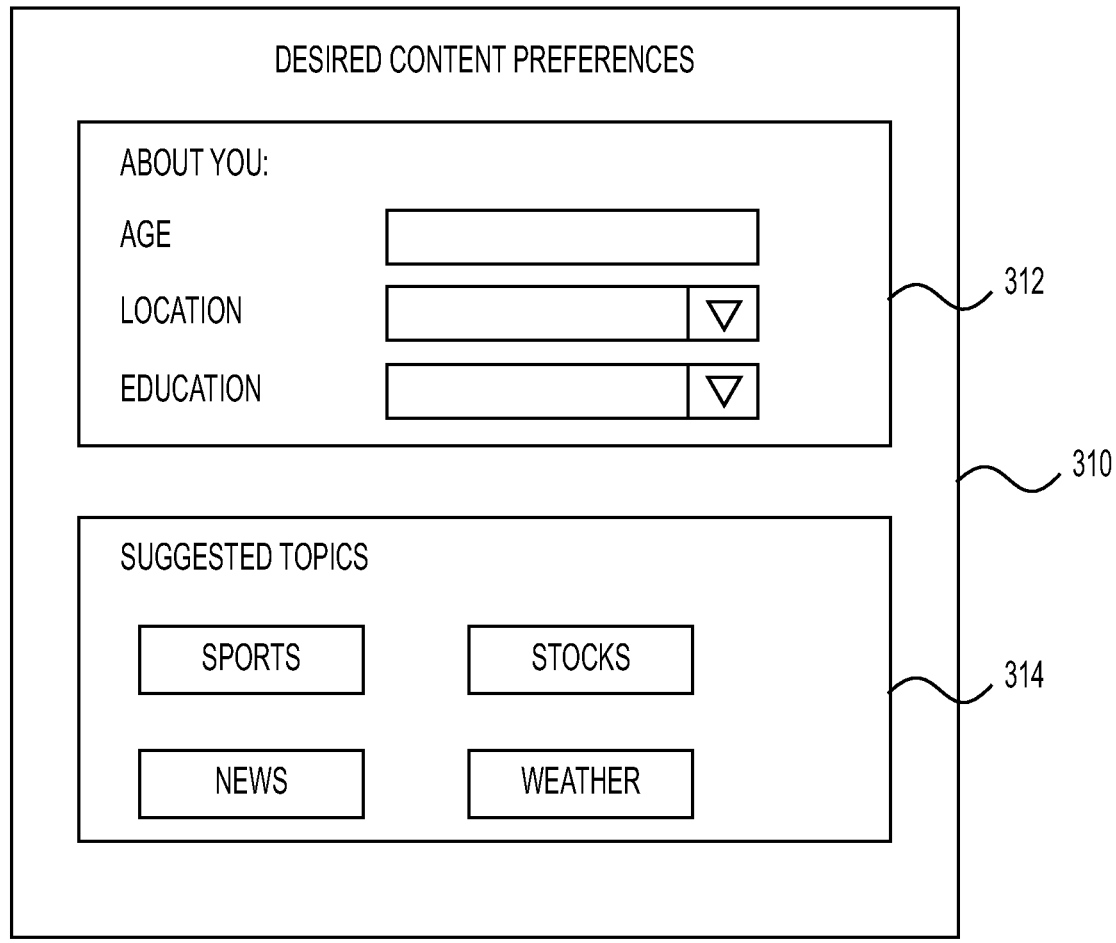
FIG. 5 is an exemplary screenshot of a web page or other graphical user interface for confirming a user request to receive content in lieu of ads, consistent with exemplary embodiments of the present disclosure.

FIG. 5 is an exemplary screenshot of a web page or other graphical user interface for confirming a user request to receive content in lieu of ads, consistent with exemplary embodiments of the present disclosure. In some embodiments, the user interface of FIG. 5 may appear upon a user selecting to receive desired content in lieu of or in addition to traditional display ads. For example, in one embodiment, upon selecting banner 304, a user may be presented with a user preference input interface 310, an example of which is illustrated in FIG. 3B. Interface 310 may allow a user to input content preferences for receiving desired content or information related to specific topics, in lieu of standard advertising content. For example, interface 310 comprises user input section 312, where a user may be able to input information about themselves. In response, suggested topics of interest to a user may be presented in suggested topics section 314. A user may then select any of the topics that are of interest to them. In one embodiment, interface 310 may include topics section 314 without user input section 312. Thus, a user may thereby request to be presented with content related to the selected content at a designated advertising space, instead of being provided with typical advertising.

Figure 6:
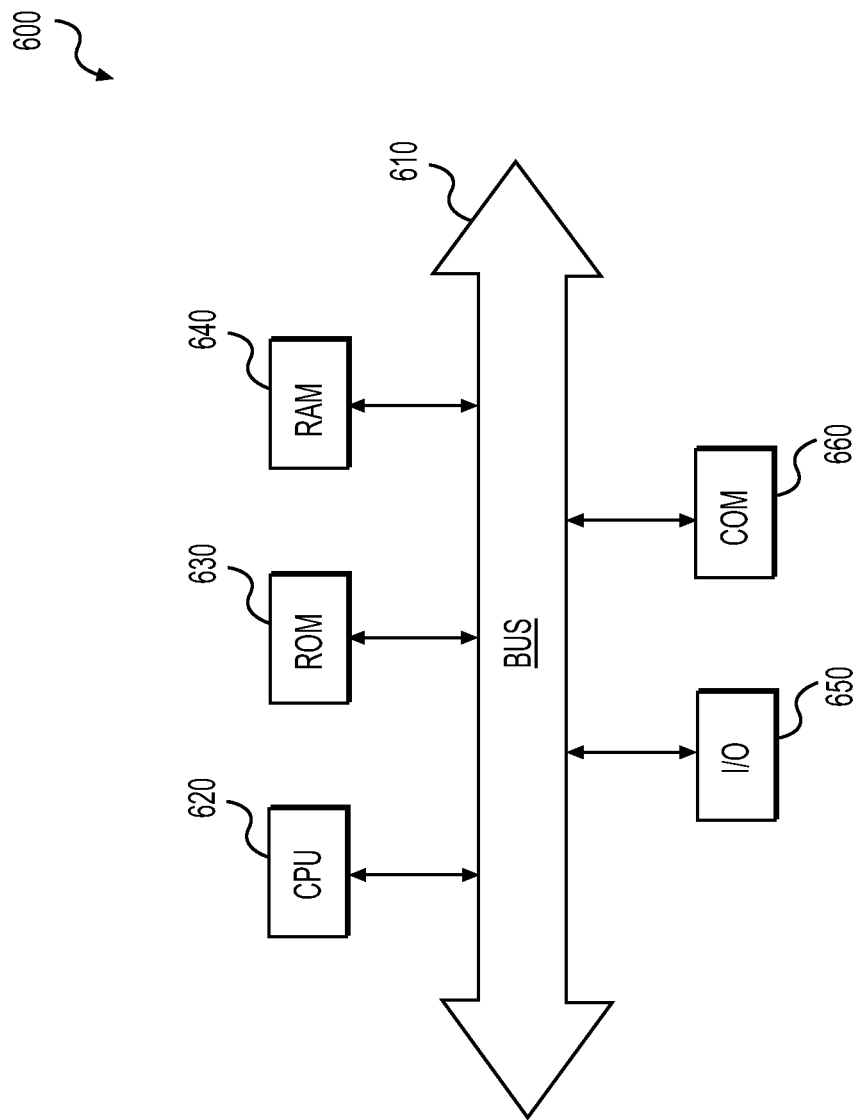
FIG. 6 is a simplified functional block diagram of a computer and/or server that may be configured as a device or system providing non-intrusive advertising in an online advertising environment, according to an exemplary embodiment of the present disclosure.

FIG. 6 illustrates a high-level functional block diagram of an exemplary computer system 600, in which embodiments of the present disclosure, or portions thereof, may be implemented, e.g., as computer-readable code. For example, each of the exemplary devices and systems described above with respect to FIG. 1 can be implemented in computer system 600 using hardware, software, firmware, tangible computer readable media having instructions stored thereon, or a combination thereof and may be implemented in one or more computer systems or other processing systems. Hardware, software, or any combination of such may embody any of the modules and components in FIG. 1, as described above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the present disclosure, as described above in the examples of FIGS. 1-5 may be implemented using computer system 600. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 6, computer system 600 includes a central processing unit (CPU) 620. CPU 620 may be any type of processor device including, for example, any type of special purpose or a general-purpose microprocessor device. As will be appreciated by persons skilled in the relevant art, CPU 620 also may be a single processor in a multi-core/multiprocessor system, such system operating alone, or in a cluster of computing devices operating in a cluster or server farm. CPU 620 is connected to a data communication infrastructure 610, for example, a bus, message queue, network, or multi-core message-passing scheme.

Computer system 600 also includes a main memory 640, for example, random access memory (RAM), and may also include a secondary memory 630. Secondary memory 630, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 630 may include other similar means for allowing computer programs or other instructions to be loaded into computer system 600. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to computer system 600.

Computer system 600 may also include a communications interface ("COM") 660. Communications interface 660 allows software and data to be transferred between computer system 600 and external devices. Communications interface 660 may include a modem, a network interface (such as an Ethernet card), a communications port, a PCM-CIA slot and card, or the like. Software and data transferred via communications interface 660 may be in the form of signals, which may be electronic, electromagnetic, optical, or other signals capable of being received by communications interface 660. These signals may be provided to communications interface 660 via a communications path of computer system 600, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. Computer system 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

It would also be apparent to one of skill in the relevant art that the present disclosure, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

It is to be understood that both the foregoing general description and the following detailed description are exemplary and explanatory only and are not restrictive of the disclosed embodiments, as claimed.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for transmitting customizable datagrams to user devices over an electronic network, the method including:
   receiving, at a user profile server, a first web request from a first user device with a unique identifier of a first user, the first web request including a first region for rendering a first webpage and a second region for displaying a first electronic content;
   accessing, through a publishing network, cookie data of the first user to determine, by the user profile server, first electronic content to be displayed in the second region based on the cookie data of the first user, the cookie data comprising online activities of the first user on a second user device and a third user device;

based on the cookie data, transmitting, to a graphical user interface of the first user device, a digital widget prompt requesting the first user to select an opt-in preference for receiving electronic content and select topics of the electronic content, wherein topics of the electric content are based on tag, like, or follow actions determined from the cookie data corresponding to a social networking website;

receiving, at the user profile server, first user input from the graphical user interface of the first user device, the first user input including a selection of the opt-in preference by the first user and topics of electronic content;

receiving, at the user profile server, demographic and preference information from other user input from other user devices;

determining, by a processor, a target audience for the first user based on the demographic and preference information from the other user input;

automatically selecting, by the processor, a first desired electronic content and a first non-intrusive electronic content wherein the selecting is based on the unique identifier associated with the first user, the first user opt-in preference, the cookie data related to the social networking website, and the determined target audience, and wherein the first non-intrusive electronic content includes a periodic display of one of a first logo, a first digital image, and a first thumbnail on the graphical user interface of the first user device;

generating, by the processor, a first datagram for display in the second region, the first datagram displayed by embedding and overlaying the first non-intrusive electronic content on the first desired electronic content;

determining, by the processor from a storage database, electronic content data updates for the first datagram;

automatically transmitting, from the processor, the electronic content data updates for displaying with the first datagram on the first user device;

based on the first unique identifier, monitoring, by the processor, interactions of the first user as the first user navigates between one or more social media platforms via the second user device;

storing, at the user profile server, tag, like, or follow actions associated with the unique identifier of the first user via the second user device and one or more specific topics that corresponds to each of the tag, like, or follow actions;

updating, by the processor, the unique identifier of the first user based on the tag, like, or follow actions of the first user on the second user device;

based on the updated unique identifier of the first user, transmitting, to a graphical user interface of the second user device, a second digital widget prompt requesting the first user to confirm an opt-in preference for receiving electronic content and select updated topics of the electronic content, wherein the updated topics of the electric content is based on the tag, like, or follow actions associated with the unique identifier of the first user;

receiving, at the user profile server, second user input from the second digital widget prompt of the graphical user interface of the second user device, the second user input including a selected confirmation of the opt-in preference and updated topics of the electronic content;

automatically selecting, by the processor, updated electronic content and a second non-intrusive electronic content wherein the selecting is based on the updated unique identifier associated with the first user, the confirmed opt-in preference and the updated topics from the second digital widget, the cookie data, and the determined target audience;

generating, by the processor, a second datagram for display in the second region, the second datagram displayed by embedding and overlaying the second non-intrusive electronic content on the updated desired electronic content;

automatically transmitting, from the processor, the updated desired electronic content data for displaying with the first datagram on the first user device;

receiving, at the user profile server from the third user device, a search query input; and based on the search query input, updating the second datagram of the graphical user interface of the first user device to include a persistent window of dynamically updated search results, the search results displayed as hyperlinks.

2. The computer-implemented method of claim 1, wherein selecting the first non-intrusive electronic content includes selecting non-intrusive electronic content based on a first user profile associated with the first user and a first target audience associated with the first datagram.

3. The computer-implemented method of claim 2, further comprising:
generating the first user profile based on one or more of a first unique identity associated with the first user, first user demographic data, first user behavior, and first user preferences.

4. The computer-implemented method of claim 1, wherein the datagram follows the user from a first platform to a second platform.

5. The computer-implemented method of claim 1, wherein the datagram follows the user from the user device to a second user device.

6. The computer-implemented method of claim 1, wherein the method further comprises providing an option to the user to modify the automatic selection of desired content in datagrams.

7. The computer-implemented method of claim 1, wherein the wherein the datagram includes a search query that receives user input and user-requested content dynamically updated based on search results.

8. A system for transmitting customizable datagrams to user devices over an electronic network, the system comprising:
a data storage device storing instructions; and
a processor configured to execute the instructions to perform a method, the method including:
receiving, at a user profile server, a first web request from a first user device with a unique identifier of a first user, the first web request including a first region for rendering a first web page and a second region for displaying a first electronic content;
accessing, through a publishing network, cookie data of the first user to determine, by the user profile server, first electronic content to be displayed in the second region based on the cookie data of the first user, the cookie data comprising online activities of the first user on a second user device and a third user device;
based on the cookie data, transmitting, to a graphical user interface of the first user device, a digital widget prompt requesting the first user to select an opt-in preference for receiving electronic content and select topics of the electronic content, wherein topics of the electric content are based on tag, like, or follow actions determined from the cookie data corresponding to a social networking website;

receiving, at the user profile server, first user input from the graphical user interface of the first user device, the first user input including a selection of the opt-in preference by the first user and topics of electronic content;

receiving, at the user profile server, demographic and preference information from other user input from other user devices;

determining, by a processor, a target audience for the first user based on the demographic and preference information from the other user input;

automatically selecting, by the processor, a first desired electronic content and a first non-intrusive electronic content wherein the selecting is based on the unique identifier associated with the first user, the first user opt-in preference, the cookie data related to the social networking website, and the determined target audience, and wherein the first non-intrusive electronic content includes a periodic display of one of a first logo, a first digital image, and a first thumbnail on the graphical user interface of the first user device;

generating, by the processor, a first datagram for in the second region, the first datagram displayed by embedding and overlaying the first non-intrusive electronic content on the first desired electronic content;

determining, by the processor, electronic content data updates for the first datagram;

automatically transmitting, from the processor, the electronic content data updates for displaying with the first datagram on the first user device;

based on the first unique identifier, monitoring, by the processor, interactions of the first user as the first user navigates between one or more social media platforms via the second user device;

storing, at the user profile server, tag, like, or follow actions associated with the unique identifier of the first user via the second user device and one or more specific topics that corresponds to each of the tag, like, or follow actions;

updating, by the processor, the unique identifier of the first user based on the tag, like, or follow actions of the first user on the second user device;

based on the updated unique identifier of the first user, transmitting, to a graphical user interface of the second user device, a second digital widget prompt requesting the first user to confirm an opt-in preference for receiving electronic content and select updated topics of the electronic content, wherein the updated topics of the electric content is based on the tag, like, or follow actions associated with the unique identifier of the first user;

receiving, at the user profile server, second user input from the second digital widget prompt of the graphical user interface of the second user device, the second user input including a selected confirmation of the opt-in preference and updated topics of the electronic content;

automatically selecting, by the processor, updated electronic content and a second non-intrusive electronic content wherein the selecting is based on the updated unique identifier associated with the first user, the confirmed opt-in preference and the updated topics from the second digital widget, the cookie data, and the determined target audience;

generating, by the processor, a second datagram for display in the second region, the second datagram displayed by embedding and overlaying the second non-intrusive electronic content on the updated desired electronic content;

automatically transmitting, from the processor, the updated desired electronic content data for displaying with the first datagram on the first user device;

receiving, at the user profile server from the third user device, a search query input; and based on the search query input, updating the second datagram of the graphical user interface of the first user device to include a persistent window of dynamically updated search results, the search results displayed as hyperlinks.

9. The system of claim 8, wherein selecting the first non-intrusive electronic content includes selecting non-intrusive electronic content based on a first user profile associated with the first user and a first target audience associated with the first datagram.

10. The system of claim 9, wherein the method further comprises:
generating the first user profile based on one or more of a first unique identity associated with the first user, first user demographic data, first user behavior, and first user preferences.

11. The system of claim 8, wherein the datagram follows the user from a first platform to a second platform.

12. The system of claim 8, wherein the datagram follows the user from the user device to a second user device.

13. The system of claim 8, wherein the system further comprises providing an option to the user to modify the automatic selection of desired content in datagrams.

14. The system of claim 8, wherein the wherein the datagram includes a search query that receives user input and user-requested content dynamically updated based on search results.

15. A non-transitory computer-readable medium storing instructions, the instructions, when executed by a computer system cause the computer system to perform a method for providing customizable datagrams to user devices over an electronic network, the method including:

receiving, at a user profile server, a first web request from a first user device with a unique identifier of a first user, the web request including a first region for rendering a first web page and a second region for displaying a first electronic content;

accessing, through a publishing network, cookie data of the first user to determine, by the user profile server, first electronic content to be displayed in the second region based on the cookie data of the first user, the cookie data comprising online activities of the first user on a second user device and a third user device;

based on the cookie data, transmitting, to a graphical user interface of the first user device, a digital widget prompt requesting the first user to select an opt-in preference for receiving electronic content and select topics of the electronic content, wherein topics of the electric content are based on tag, like, or follow actions determined from the cookie data corresponding to a social networking website;

receiving, at the user profile server, first user input from the graphical user interface of the first user device, the first user input including a selection of the opt-in preference by the first user and topics of electronic content;

receiving, at the user profile server, demographic and preference information from other user input from other user devices;

determining, by a processor, a target audience for the first user based on the demographic and preference information from the other user input;

automatically selecting, by the processor, a first desired electronic content and a first non-intrusive electronic content wherein the selecting is based on the unique identifier associated with the first user, the first user opt-in preference, the cookie data related to the social networking website, and the determined target audience, and wherein the first non-intrusive electronic content includes a periodic display of one of a first logo, a first digital image, and a first thumbnail on the graphical user interface of the first user device;

generating, by the processor, a first datagram for display in the second region, the first datagram displayed by embedding and overlaying the first non-intrusive electronic content on the first desired electronic content;

determining, by the processor from a storage database, electronic content data updates for the first datagram;

automatically transmitting, from the processor, the electronic content data updates for displaying with the first datagram on the first user device;

based on the first unique identifier, monitoring, by the processor, interactions of the first user as the first user navigates between one or more social media platforms via the second user device;

storing, at the user profile server, tag, like, or follow actions associated with the unique identifier of the first user via the second user device and one or more specific topics that corresponds to each of the tag, like, or follow actions;

updating, by the processor, the unique identifier of the first user based on the tag, like, or follow actions of the first user on the second user device;

based on the updated unique identifier of the first user, transmitting, to a graphical user interface of the second user device, a second digital widget prompt requesting the first user to confirm an opt-in preference for receiving electronic content and select updated topics of the electronic content, wherein the updated topics of the electric content is based on the tag, like, or follow actions associated with the unique identifier of the first user;

receiving, at the user profile server, second user input from the second digital widget prompt of the graphical user interface of the second user device, the second user input including a selected confirmation of the opt-in preference and updated topics of the electronic content;

automatically selecting, by the processor, updated electronic content and a second non-intrusive electronic content wherein the selecting is based on the updated unique identifier associated with the first user, the confirmed opt-in preference and the updated topics from the second digital widget, the cookie data, and the determined target audience;

generating, by the processor, a second datagram for display in the second region, the second datagram displayed by embedding and overlaying the second non-intrusive electronic content on the updated desired electronic content;

automatically transmitting, from the processor, the updated desired electronic content data for displaying with the first datagram on the first user device;

receiving, at the user profile server from the third user device, a search query input; and based on the search query input, updating the second datagram of the graphical user interface of the first user device to include a persistent window of dynamically updated search results, the search results displayed as hyperlinks.

16. The non-transitory computer-readable medium storing instructions of claim 15, wherein the datagram follows the user from a first platform to a second platform.

17. The non-transitory computer-readable medium storing instructions of claim 15, wherein the datagram follows the user from the user device to a second user device.

18. The non-transitory computer-readable medium storing instructions of claim 15, wherein the method further comprises providing an option to the user to modify the automatic selection of desired content in datagrams.

19. The non-transitory computer-readable medium storing instructions of claim 15, wherein the datagram includes a search query that receives user input and user-requested content dynamically updated based on search results.

* * * * *